(12) United States Patent
Liu et al.

(10) Patent No.: US 10,908,445 B2
(45) Date of Patent: Feb. 2, 2021

(54) DISPLAY COMPONENT AND DISPLAY DEVICE

(71) Applicant: BOE TECHNOLOGY GROUP CO., LTD., Beijing (CN)

(72) Inventors: Yingming Liu, Beijing (CN); Xue Dong, Beijing (CN); Jing Lv, Beijing (CN); Haisheng Wang, Beijing (CN); Xiaoliang Ding, Beijing (CN); Chunwei Wu, Beijing (CN); Rui Xu, Beijing (CN); Lijun Zhao, Beijing (CN); Changfeng Li, Beijing (CN); Yanan Jia, Beijing (CN); Yuzhen Guo, Beijing (CN); Pengpeng Wang, Beijing (CN); Wei Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 339 days.

(21) Appl. No.: 15/580,899

(22) PCT Filed: May 5, 2017

(86) PCT No.: PCT/CN2017/083193
§ 371 (c)(1),
(2) Date: Dec. 8, 2017

(87) PCT Pub. No.: WO2018/000935
PCT Pub. Date: Jan. 4, 2018

(65) Prior Publication Data
US 2018/0307088 A1    Oct. 25, 2018

(30) Foreign Application Priority Data

Jun. 30, 2016 (CN) .......................... 2016 1 0509226

(51) Int. Cl.
*G02F 1/1333* (2006.01)
*G06F 3/044* (2006.01)
(Continued)

(52) U.S. Cl.
CPC .... *G02F 1/133345* (2013.01); *G02F 1/13338* (2013.01); *G06F 3/042* (2013.01);
(Continued)

(58) Field of Classification Search
None
See application file for complete search history.

(56) References Cited

U.S. PATENT DOCUMENTS

2010/0007632 A1* 1/2010 Yamazaki ............... G06F 21/32
345/175
2013/0308073 A1* 11/2013 Yamazaki ........... H01L 27/3227
349/46

(Continued)

FOREIGN PATENT DOCUMENTS

CN    101216626 A    7/2008
CN    101840290 A    9/2010
(Continued)

OTHER PUBLICATIONS

International search report dated Aug. 14, 2017 for corresponding application PCT/CN2017/083193 with English tanslation attached.
(Continued)

*Primary Examiner* — Amare Mengistu
*Assistant Examiner* — Sarvesh J Nadkarni
(74) *Attorney, Agent, or Firm* — Nath, Goldberg & Meyer; Joshua B. Goldberg (57) ABSTRACT

The present application belongs to the field of display technology, more particularly, relates to a display component and a display device. The display component comprises a display panel having a plurality of pixel structures. A
(Continued)

packaging film is provided above the display panel. In each of the pixel structures, a control element and a photosensitive element connected with the control element are provided above the packaging film. The photosensitive element performs fingerprint identification according to received reflection light reflected by a finger after being emitted by the display panel. The display component implements optical fingerprint identification based on the display panel. By providing the photosensitive elements and respective control elements above the packaging film, accurate fingerprint identification is implemented.

17 Claims, 3 Drawing Sheets (51) Int. Cl.
  *G06K 9/00* (2006.01)
  *G06F 3/041* (2006.01)
  *G06F 3/042* (2006.01)
(52) U.S. Cl.
  CPC ............ *G06F 3/044* (2013.01); *G06F 3/0412* (2013.01); *G06K 9/0004* (2013.01); *G06K 9/00013* (2013.01); *G06F 2203/04106* (2013.01); *G06K 9/0008* (2013.01)

(56) References Cited

U.S. PATENT DOCUMENTS

| | | | | |
|---|---|---|---|---|
| 2015/0125973 | A1* | 5/2015 | Choi | H01L 27/3276 438/23 |
| 2016/0042216 | A1* | 2/2016 | Yang | G06K 9/0002 382/124 |
| 2016/0085341 | A1 | 3/2016 | Konicek | |
| 2016/0098140 | A1* | 4/2016 | Lee | G06F 3/0416 345/173 |
| 2016/0266721 | A1* | 9/2016 | Kurokawa | G06F 3/0416 |
| 2017/0228580 | A1* | 8/2017 | Li | G06K 9/0004 |

FOREIGN PATENT DOCUMENTS

| | | |
|---|---|---|
| CN | 102023764 A | 4/2011 |
| CN | 104155785 A | 11/2014 |
| CN | 104881195 A | 9/2015 |
| CN | 105095883 A | 11/2015 |
| CN | 105184247 A | 12/2015 |
| CN | 106055162 A | 10/2016 |

OTHER PUBLICATIONS

Chinese office action dated Jun. 11, 2018 for corresponding application No. 201610509226.3 with English translation attached.

* cited by examiner

DISPLAY COMPONENT AND DISPLAY DEVICE

This is a National Phase Application filed under 35 U.S.C. 371 as a national stage of PCT/CN2017/083193, filed May 5, 2017, an application claiming the benefit of Chinese Application No. 201610509226.3, filed Jun. 30, 2016, the content of each of which is hereby incorporated by reference in its entirety.

TECHNICAL FIELD

The present disclosure relates to the field of display technology, more particularly, to a display component and a display device.

BACKGROUND

Fingerprint identification has advantages of high specificity, high speed, low price, high user acceptance, and so on, Fingerprint identification technology has been widely used in numerous fields, for example the electronic terminal, such as a mobile, a tablet computer, a television etc.; and the security system such as an entrance guard, a safe etc.

SUMMARY

The present application provides a display component and a display device.

An aspect of the present application provides a display component comprising a display panel having a plurality of pixel structures, wherein the display component further comprises:

a packaging film provided above the display panel;

a control element and a photosensitive element connected with the control element, which are provided above the packaging film and correspond to pixel structure, wherein the photosensitive element performs fingerprint identification according to received reflection light reflected by a finger after being emitted by the display panel.

Optionally, the display panel, and control elements and photosensitive elements provided above the display panel are provided on a side of a base substrate for carrying the display component.

Optionally, the display component further comprises a common electrode, wherein the control element comprises an outputting electrode, the photosensitive element comprises a photosensitive layer and a first electrode and a second electrode which supply a bias voltage to the photosensitive layer, the outputting electrode of the control element is the first electrode of the photosensitive element, and the common electrode is the second electrode of the photosensitive element.

Optionally, a touch control electrode is further provided above the photosensitive layer of the photosensitive element, the touch control electrode is connected to the photosensitive layer and the common electrode, respectively, and the touch control electrode covers at least a region corresponding to the photosensitive layer.

Optionally, the control element is a thin film transistor comprising a gate, a gate insulation layer, an active layer, and a source and a drain provided in a same layer, which are stacked layer-by-layer; in the photosensitive element, one side of the photosensitive layer is connected to the drain of the thin film transistor, and another side of the photosensitive layer is connected to the common electrode.

Optionally, the display component further comprises a scanning driver and a signal receiver, wherein the scanning driver is connected with a plurality of scanning lines, and the gates of the thin film transistors in a single row are connected with a single scanning line so as to supply a clamping voltage to the photosensitive elements; the signal receiver is connected with a plurality of data lines, and the sources of the thin film transistors in a single column are connected with a single data line so as to receive a fingerprint sensing signal.

Optionally, a protective layer is further provided above the source, the drain, and the active layer between the source and the drain, and the protective layer is formed by an opaque metal material.

Optionally, a protective electrode is further provided between the photosensitive layer of the photosensitive element and the touch control electrode provided above the photosensitive layer, and a pattern of the protective electrode covers at least a pattern of the photosensitive layer.

Optionally, the touch control c ode and the protective electrode both are formed by a transparent conductive material.

Optionally, the gate and the common electrode are insulated from each other and provided in a single layer;

a first via is provided in a region of the gate insulation layer corresponding to the common electrode, a connection electrode is formed in the first via and in a same layer as the source and the drain, the connection electrode is connected to the common electrode but is insulated from the source and the drain;

a passivation layer and a resin layer are provided above the source and the drain and the connection electrode, a second via is provided in a region of the passivation layer and the resin layer corresponding to the connection electrode, a third via is provided in the resin layer corresponding to and above the photosensitive layer, a touch control electrode is formed above the passivation layer and within the second via and the third via, and the touch control electrode is connected to the common electrode through the connection electrode.

Optionally, the gate and the common electrode are formed by a same material in a single patterning process; the source, the drain and the connection electrode are formed by a same material in a single patterning process.

Optionally, the packaging film is formed at a display side of the display panel by printing.

Optionally, the display panel comprises a plurality of pixel regions, a pixel structure is provided correspondingly in a pixel region, the control element and the photosensitive element are provided in a gap region between adjacent pixel regions.

Optionally, the pixel region is provided at a sunken region relative to the gap region.

Optionally, the display panel is a liquid crystal display panel, each of the pixel structures comprises a color filter substrate, an array substrate provided opposite to the color filter substrate, and liquid crystal molecules provided between the color filter substrate and the array substrate, a driving thin film transistor for supplying a driving voltage to the liquid crystal molecules is included in the array substrate.

Optionally, the display panel is an OLED display panel, each of the pixel structures comprises an MED device and a driving thin film transistor for supplying a driving current to the OLED device.

Optionally, the photosensitive layer in the photosensitive element comprises a P-type silicon layer, an intrinsic layer and an N-type silicon layer provided sequentially.

Optionally, the P-type silicon layer, the intrinsic layer and the N-type silicon layer are formed separately by printing.

Another aspect of the present application provides a display device, which comprises the above display component.

REFERENCE NUMERALS

1—display panel; 1a—pixel display structure; 1b—pixel control layer;
2—packaging film;
3—control element; 31—gate; 32—gate insulation layer; 33—active layer; 34—source; 35—drain; 36—first passivation layer; 37—protective layer; 38—resin layer; 39—second passivation layer;
4—photosensitive element; 41—photosensitive layer;
5—common electrode; 6—connection electrode; 7—touch control electrode; 8—protective electrode;
91—base substrate; 92—glass cover plate; 10—sealant;
11—scanning driver; 111—scanning line; 12—signal receiver; 121—data line; 13—touch control line.

DETAILED DESCRIPTION

The display component and the display device of the present application will be further described in detail below in conjunction with accompanying drawings and specific embodiments, in order that a person skilled in the art can understand the technical solutions of the present application better.

Fingerprint identification is generally implemented by way of optical diffuse reflection. During fingerprint identification, a light beam emitted by a light source is irradiated to a finger and diffused by the finger. The energy of the light diffused by fingerprint valleys of the finger (hereinafter referred to as the valleys) is different from that of the light diffused by fingerprint ridges of the finger (hereinafter referred to as the ridges). Since the energy of the light diffused by the valleys is lower than that of the light diffused by the ridges, such a difference is used to perform the fingerprint identification.

At present, although fingerprint identification is widely used, its accuracy is low. In particular, a device with both a fingerprint identification function and a touch control function has a redundant and complex structure.

Thus, an urgent technical problem to be solved is to design a device capable of identifying a fingerprint accurately.

An present embodiment provides a display component, in which optical fingerprint identification is implemented based on a display panel; by providing photosensitive elements and respective control elements above the display panel, valleys and ridges of a fingerprint may be identified accurately, resulting in an accurate fingerprint identification; by forming patterns of touch control electrodes above the photosensitive elements and respective control elements, a touch control function is also implemented; and the structure of the display component is easy to realize.

Figure 1:
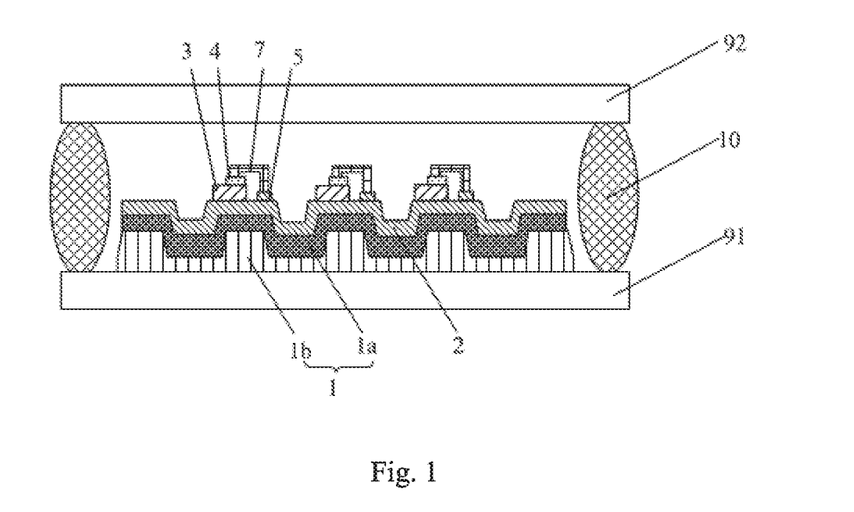
FIG. 1 is a structural schematic diagram of a display component in an embodiment of the present application.

As shown in FIG. 1, the display component comprises a display panel having a plurality of pixel structures 1. A packaging film 2 is provided above the display panel 1. In each of the plurality of the pixel structures 1, a control element 3 and a photosensitive element 4 connected with the control element 3 are provided above the packaging film 2. The control element 3 supplies a clamping voltage to the photosensitive element 4. The photosensitive element 4 performs fingerprint identification (alternatively, palm identification) according to received reflection light which is from light emitted by the display panel 1. In addition, by further providing a pattern of a touch control electrode, position information of a touch control point may also be acquired. With the above display component, both functions of fingerprint identification and touch control are achieved. That is to say, the touch control function is also realized in addition to the fingerprint identification function; in other words, the fingerprint identification function is also realized in addition to the touch control function.

Figure 2:
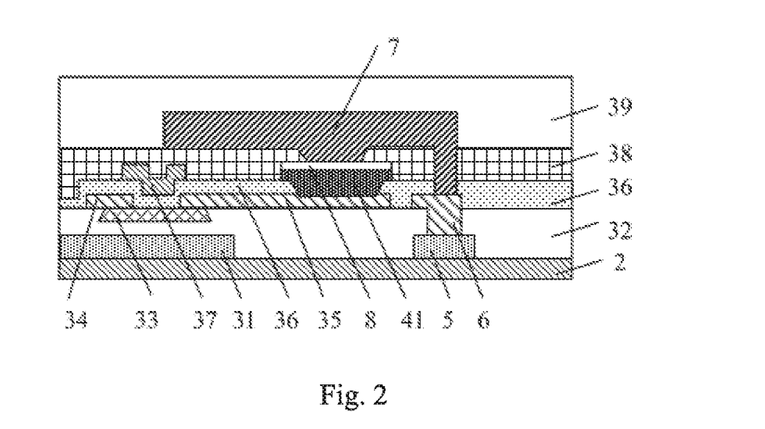
FIG. 2 is a structural schematic diagram of the display component shown in FIG. 1 in which a control element and a photosensitive element above a packaging film are illustrated.

It should be appreciated that, for the sake of brevity, a portion of the display device under the packaging film 2 in FIG. 1 is simply illustrated as comprising a pixel control layer 1b (e.g., a driving thin film transistor) and a pixel display structure 1a (e.g., an Organic Light-Emitting Device). FIG. 2 illustrates stacked structures of the control element 3 and the photosensitive element 4 in detail.

FIG. 2 illustrates specific structures of the control element 3 and the photosensitive element 4. In FIG. 2, the display component further comprises a common electrode 5, the control element 3 comprises an outputting electrode, and the photosensitive element 4 comprises a photosensitive layer 41, and a first electrode and a second electrode supplying a bias voltage to the photosensitive layer 41. The outputting electrode of the control element 3 is the first electrode of the photosensitive element 4, the common electrode 5 is the second electrode of the photosensitive element 4. That is, in order to simplify the structure, the outputting electrode of the control element 3 also functions as an electrode of the photosensitive element; meanwhile, under the action of the clamping voltage of the control element 3 and the reference voltage of the common electrode 5, fingerprint identification is implemented by detecting the current flowing through the photosensitive element 4.

The control element 3 may be a thin film transistor. The thin film transistor may comprises a gate 31, a gate insulation layer 32, an active layer 33, and a source 34 and a drain 35 provided in a same layer, which are stacked layer-by-layer; in the photosensitive element 4, one side of the photosensitive layer 41 is connected to the drain 35 of the thin film transistor, and the other side of the photosensitive layer 41 is connected to the common electrode 5. Optionally, the photosensitive element 4 is a photodiode, the drain 35 of the thin film transistor also functions as an anode of the photodiode, and the common electrode 5 also functions as a cathode of the photodiode. With the control element 3 and the photosensitive element 4, under the action of the clamping voltage of the control element 3 and the reference voltage of the common electrode 5, supplying a bias voltage to the photodiode is achieved.

Figure 3:
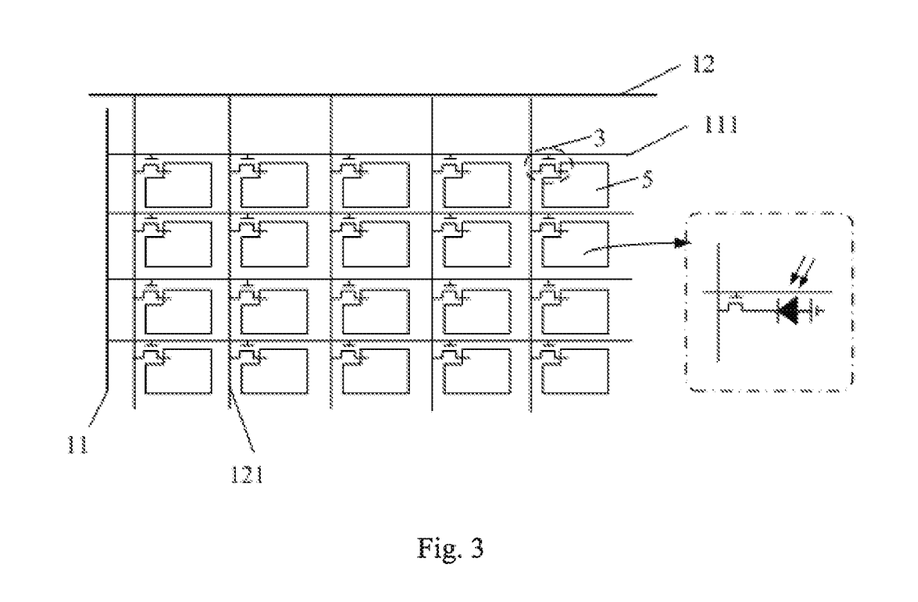
FIG. 3 is a structural schematic diagram of the control element and the photosensitive element shown in FIG. 2.

Referring to the plan view of FIG. 3, in the display component of the present embodiment, the control element 3 is driven through a scanning driver 11, and receives a fingerprint sensing signal through a signal receiver 12. The scanning driver 11 is connected with a plurality of scanning lines 111, and the gates of the thin film transistors in a single row are connected with a single scanning line 111; the signal receiver 12 is connected with a plurality of data lines 121, and the sources of the thin film transistors in a single column are connected with a single data line 121. Here, the thin film transistors in respective rows are controlled to be ON/OFF through scanning lines 111 so as to supply clamping voltages to the photosensitive elements 4. Respective data lines 121 receive fingerprint sensing signals so that fingerprint identification is performed by using the difference between the current for the valleys and the current for the ridges. The fingerprint sensing signals are collected optically. When a finger presses on the glass cover plate 92, the finger is irradiated by light emitted from pixel regions. Most part of light beams diffused by the finger is reflected by the glass cover plate 92 onto the photosensitive elements 4, and received and converted to electric signals by the photosensitive elements 4. The intensity of the light reflected by the valleys is different from that of the light reflected by the ridges, thus causing the photosensitive elements 4 to have different resistances. This results in different currents of the data lines 121 since the voltage of the power supply is constant. Thus, corresponding positions of the valleys and the ridges are identified.

Figure 4:
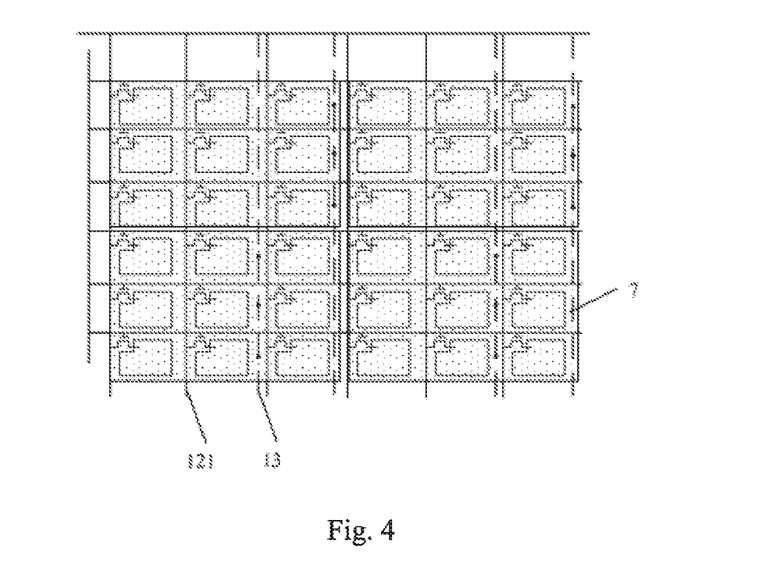
FIG. 4 is a structural schematic diagram of the display component comprising the control element, the photosensitive element and a touch control electrode shown in FIG. 2.

Further, a touch control electrode 7 is provided above the photosensitive layer 41 of the photosensitive element 4. The touch control electrode 7 is connected to the photosensitive layer 41 and the common electrode 5 respectively. The touch control electrode 7 covers at least a region corresponding to the photosensitive layer 41. As shown in FIG. 4, the touch control electrode 7 may be plate-shaped, and cover both the control elements 3 and the photosensitive elements 4 corresponding to multiple pixel structures so as to enable self-capacitive touch control detection.

Optionally, a protective electrode 8 is correspondingly provided above the photosensitive layer 41 and under the touch control electrode 7. A pattern of the protective electrode 8 covers at least the pattern of the photosensitive layer 41. Both the touch control electrode 7 and the protective electrode 8 are formed by a transparent conductive material. Since the protective electrode 8 is formed by a transparent conductive material, the display will not be influenced. The protective electrode 8 can not only protect the photosensitive diode during a patterning process for forming the touch control electrode (for example, prevent the photosensitive layer 41 from being influenced by the etchant in an etching step), but also function as a touch electrode between the common electrode 5 and the photosensitive layer 41 to ensure electric connection therebetween.

The gate 31 and the common electrode 5 are insulated from each other and provided in a single layer; a first via is provided in a region of the gate insulation layer 32 corresponding to the common electrode 5, a connection electrode 6 is formed in the first via and in a same layer as the source 34 and the drain 35, the connection electrode 6 is connected to the common electrode 5 but is insulated from the source 34 and the drain 35; a first passivation layer 36 and a resin layer 38 are provided above the source 34 and the drain 35 and the connection electrode 6, a second via (which is a via penetrating through the first passivation layer 36 and the resin layer 38 simultaneously) is provided in regions of the first passivation layer 36 and the resin layer 38 corresponding to the connection electrode 6, a third via is provided in an area of the resin layer 38 corresponding to and above the photosensitive layer 41, a touch control electrode 7 is formed in a same layer above the first passivation layer 36 and within the second via and the third via, and the touch control electrode 7 is connected to the common electrode 5 through the connection electrode 6.

In a preparing process, the connection electrode 6 and the touch control electrode 7 are formed in different patterning processes. The connection electrode 6 is mainly used to connect one electrode of the photosensitive element 4 and the touch control electrode 7, and may be formed by a transparent conductive material or by an opaque conductive material; while the touch control electrode 7 is generally formed by a transparent conductive material.

Here, the touch control 7 is formed by a conductive portion between the photosensitive layer 41 and the cathode of the photosensitive element 4. That is, when the reference voltage of the common electrode 5 is introduced to the photosensitive layer 41, a pattern of the touch control electrode 7 is formed between the protective electrode 8 and the connection electrode 6. Thereby, both fingerprint identification function and touch control function can be implemented. Referring to FIG. 4, the touch control electrodes 7 in a single column are connected to a single touch control line 13 (illustrated as the broken line in FIG. 4) so as to realize transmission of an excitation signal and reception of a touch control signal. The principle of the self-capacitive touch control for the touch control electrodes 7 is the same as the existing self-capacitive touch control principle, and will not be described in detail here.

In addition, a protective layer 37 is further provided above the source 34, the drain 35, and the active layer 36 between the source 34 and the drain 35. The protective layer 37 is formed by an opaque metal material (such as Mo, Al, and so on). The protective layer 37 can protect a channel between the source 34 and the drain 35 during the ON state of the thin film transistor, and prevent performance of the control element 3 from being influenced by light so as to ensure that the photosensitive element 4 can work normally; a second passivation layer 39 is further provided above the touch control electrode 7. The second passivation layer 39 can protect the touch control electrode 7 and the layer structures therebelow. With the above processes, a complete structure of the control element 3 and the photosensitive element 4 may be formed, and the touch control function may be achieved in addition to the fingerprint identification function.

Optionally, the gate 31 and the common electrode 5 are formed by a same material and by a single patterning process; the source 34, the drain 35 and the connection electrode 6 are formed by a same material and in a single patterning process. Here, patterns of several functional components are formed by a single patterning process in order to simplify the process.

In the display component of the present embodiment, the photosensitive element 4 may be a PIN photosensitive diode. Optionally, the photosensitive layer 41 comprises a P-type silicon layer, an intrinsic layer and an N-type silicon layer provided sequentially. The P-type silicon layer is formed by the mixture of $SiH_4$ and $B_2H_6$, the intrinsic layer is formed by $SiH_4$ or by the mixture of $SiH_4$ and $H_2$, and the N-type silicon layer is formed by the mixture of $SiH_4$, $PH_3$, and $H_2$. During preparing, the P-type silicon layer, the intrinsic layer and the N-type silicon layer are separately formed by printing. Printing may form a pattern more accurately and precisely. The PIN photosensitive diode, which is a photosensitive element, may have a decreased resistance when it is irradiated by light and thus the current may be increased, and the stronger the intensity of the illumination, the smaller the resistance. Based on this principle, the intensities of the illuminations corresponding to the valleys and the ridges of the fingerprint are determined. Regions having relative large intensity correspond to the ridges of the fingerprint, while regions having relative small intensity correspond to the valleys of the fingerprint.

Typically, the display panel 1 comprises a plurality of pixel regions. Each of the regions is provided with a pixel structure. The control elements 3 and the photosensitive elements 4 are provided in a gap region between adjacent pixel regions. Here, the gap region is a boundary with a certain width between a pixel region and another pixel region adjacent thereto so that an independent pixel structure is formed within each of the pixel regions and used for performing monochrome display (for example, displaying any one of the three primary colors of red, green and blue, or any one of the colors of red, green, blue and white, or any one of the colors of red, green, blue, purple, cyan, and yellow, and so on). Typically, the region in the display panel corresponding to the boundary between the pixel regions is a non-transparent region, and is usually for arranging opaque wires such as data lines and scanning lines therein; in order to obtain a better shading effect, a black matrix may be provided. In the present embodiment, the control elements 3 and the photosensitive elements 4 are provided in the non-transparent region, and thereby ensuring not to influence the display effect of the display panel.

For example, the display panel 1 may be a liquid crystal display panel, a pixel display structure 1a of each pixel structure comprises a color filter substrate, an array substrate opposite to the color filter substrate, and liquid crystal molecules provided between the color film substrate and the array substrate, and a pixel control layer 1b includes a driving thin film transistor for supplying a driving voltage to the liquid crystal molecules; optionally, the display panel may be an OLED display panel, a pixel display structure 1a of each pixel structure comprises an OLED device, and a pixel control layer 1b includes a driving thin film transistor for supplying a driving current to the OLED device.

Optionally, the packaging film 2 is formed at a display side of the display panel 1 by printing. That is, the display portion of the display panel may be packaged by Thin Film Encapsulation (TFE). Thereafter, the fingerprint identifying devices and the touch control devices are formed above an area of the display portion corresponding to the non-transparent region by printing or other fabrication process. With such simple processes, not only the display panel can be protected, but also fingerprint identification and touch control positioning can be achieved. Moreover, a product fabricated may have stable performance.

If the control elements 3 and the photosensitive elements 4 are formed on a side of the glass cover plate 92 facing to the base substrate 91, and the display portion is formed on a side of the base substrate 91 facing to the glass cover plate 92, attention should be paid to a possible alignment offset of the control elements 3 and the photosensitive elements 4 on the glass cover plate 92 with respect to the pixel structures of the display portion on the base substrate 91. In order to obtain higher product yield, the area of a photosensitive element 4 should be made smaller than the theoretical area under the ideal condition with which accurate alignment is achieved so that the display will not be influenced even when the alignment offset occurs. However, this inevitably results in decreased photosensitive area of, for example, the photosensitive element 4 of the PIN photosensitive diode, and in turn influencing the accuracy of fingerprint identification.

In the display component of the present embodiment, since the control elements 3 and the photosensitive elements 4 are integrated into the display portion and are formed at the same side of the glass cover plate 92, it is unnecessary to consider aligning the control elements 3 and the photosensitive elements 4 with the pixel structures of the display portion. Thus, for example, maximization of the photosensitive area of the photosensitive elements of the PIN photosensitive diode, good photosensitive characteristics and accurate fingerprint identification can be achieved.

Meanwhile, in the display component of the present embodiment, since the photosensitive elements 4 are fabricated in the non-display area above the packaging film 2 of the display device, and the pixel regions of the display panel are sunken, the light emitted from the pixel regions is less likely to irradiate the sides of the photosensitive elements 4, and thereby more collimated orientation of the light is achieved, and a base will not be influenced, resulting in accurate fingerprint identification.

It will be appreciated that the display component also comprises components such as the sealant 10. As shown in FIG. 1, the sealant 10 is provided between the base substrate 91 and the glass cover plate 92, and has a same function as that of an existing display panel, and thus will not be described in detail here.

Figure 5:
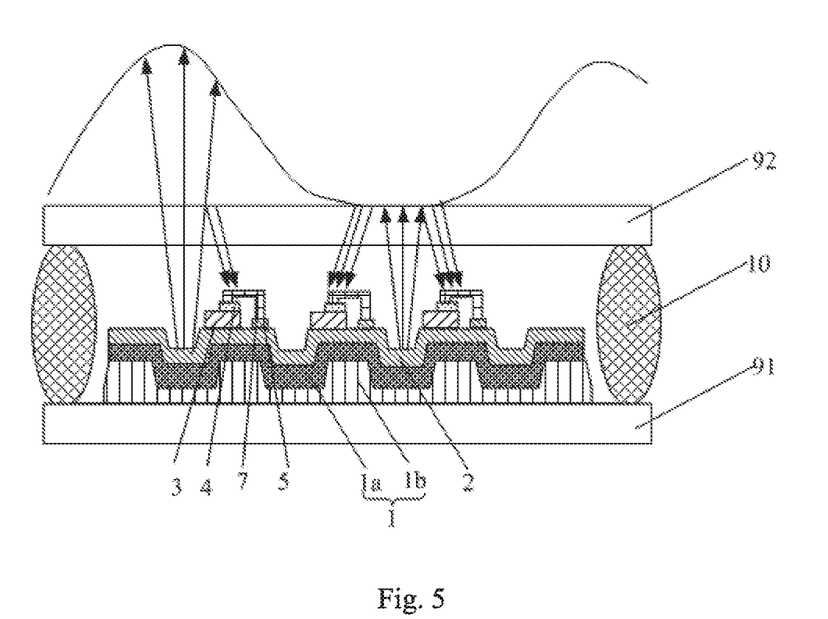
FIG. 5 is a working principle diagram of the display component in the embodiment of the present application.

As shown in FIG. 5, the specific working principle of the fingerprint identification method of the display component in the present embodiment is as follows:

1) resetting: turning on the gate of a thin film transistor which is the control element 3, supplying a voltage V1 to the P end (the anode) of the photosensitive diode, and then turning off the gate; in this case, the potential of the drain of the thin film transistor is locked to V1, the common electrode which is electrically connected to the cathode of the photosensitive diode is at a reference ground potential or supplies a low voltage V0, and at this time, the PIN photosensitive diode is in a reverse bias state;

2) accumulating fingerprint information: when a finger presses on the surface of the display component, the valleys (or the ridges) of the finger will reflect the light emitted from the display panel to the photosensitive diode, and photons will cause the high potential of the photosensitive diode in the reverse bias state to decrease; since the intensities of the light reflected by the valleys and the ridges are different from each other, the potentials decreased by them are also different;

3) reading the fingerprint: when the gate of the thin film transistor is turned on again, due to different drain potentials, the photosensitive diode will output different currents which may be used for determining the positions of the valleys and the ridges, and thereby achieving fingerprint identification.

The display component implements optical fingerprint identification based on the display panel. The photosensitive elements and respective control elements are provided above the packaging film. Since the contact surface of the valleys and that of the ridges are different, intensities of the reflection lights are different, causing respective photosensitive elements to generate different currents so as to be used for determining the positions of the valleys and the ridges, and thereby achieving an accurate fingerprint identification.

The present application also provides a display device which comprises the display component in the above embodiment.

The display device may be any product or component having the display function, such as an electronic paper, a mobile phone, a tablet computer, a television, a display, a notebook computer, a digital photo frame, a navigator, and so on. The display device can provide better unlocking experience for people owing to its better fingerprint identification effect.

It will be appreciated that the above embodiments are exemplary implementations for the purpose of illustrating the principle of the present application only, and the present application is not limited thereto. It will be apparent to a person skilled in the art that many variations and modifications may be made without departing from the spirit and essence of the present application. These variations and modifications should also be considered as the protective scope of the present application.

What is claimed is:

1. A display component comprising a display panel having a plurality of pixel structures, wherein the display component further comprises:
a packaging film provided above the display panel;
a control element and a photosensitive element connected with the control element, which are provided above the packaging film and correspond to a pixel structure,
wherein the photosensitive element performs fingerprint identification according to received reflection light reflected by a finger after being emitted by the display panel;
wherein the display panel and the control element and the photosensitive element provided above the display panel are provided on a side of a base substrate for carrying the display component;
the display component further comprises a common electrode, wherein the control element comprises an outputting electrode, the photosensitive element comprises a photosensitive layer and a first electrode and a second electrode which supply a bias voltage to the photosensitive layer, the outputting electrode of the control element is the first electrode of the photosensitive element, and the common electrode is the second electrode of the photosensitive element; and
wherein the control element is a thin film transistor comprising a gate, a gate insulation layer, an active layer, and a source and a drain provided in a same layer, which are stacked layer-by-layer; in the photosensitive element, one side of the photosensitive layer is connected to the drain of the thin film transistor, and another side of the photosensitive layer is connected to the common electrode.

2. The display component of claim 1, wherein a touch control electrode is further provided above the photosensitive layer of the photosensitive element, the touch control electrode is connected to the photosensitive layer and the common electrode, respectively, and the touch control electrode covers at least a region corresponding to the photosensitive layer.

3. The display component of claim 2, wherein a protective electrode is further provided between the photosensitive layer of the photosensitive element and the touch control electrode provided above the photosensitive layer, and a pattern of the protective electrode covers at least a pattern of the photosensitive layer.

4. The display component of claim 3, wherein the touch control electrode and the protective electrode both are formed by a transparent conductive material.

5. The display component of claim 1, further comprising a scanning driver and a signal receiver, wherein the scanning driver is connected with a plurality of scanning lines, and the gates of the thin film transistors in a single row are connected with a single scanning line so as to supply a clamping voltage to the photosensitive elements; the signal receiver is connected with a plurality of data lines, and the sources of the thin film transistors in a single column are connected with a single data line so as to receive a fingerprint sensing signal.

6. The display component of claim 1, wherein a protective layer is further provided above the source, the drain, and the active layer between the source and the drain, and the protective layer is formed by an opaque metal material.

7. The display component of claim 6, wherein the gate and the common electrode are insulated from each other and provided in a single layer;
a first via is provided in a region of the gate insulation layer corresponding to the common electrode, a connection electrode is formed in the first via and in a same layer as the source and the drain, the connection electrode is connected to the common electrode but is insulated from the source and the drain;
a passivation layer and a resin layer are provided above the source and the drain and the connection electrode, a second via is provided in a region of the passivation layer and the resin layer corresponding to the connection electrode, a third via is provided in the resin layer corresponding to and above the photosensitive layer, a touch control electrode is formed above the passivation layer and within the second via and the third via, and the touch control electrode is connected to the common electrode through the connection electrode.

8. The display component of claim 7, wherein the gate and the common electrode are formed by a same material in a single patterning process;
the source, the drain and the connection electrode are formed by a same material in a single patterning process.

9. The display component of claim 1, wherein the packaging film is formed at a display side of the display panel by printing.

10. The display component of claim 1, wherein the display panel comprises a plurality of pixel regions, a pixel structure is provided correspondingly in a pixel region, the control element and the photosensitive element are provided in a gap region between adjacent pixel regions.

11. The display component of claim 10, wherein the pixel region is provided at a sunken region relative to the gap region.

12. The display component of claim 1, wherein the display panel is a liquid crystal display panel, each of the pixel structures comprises a color filter substrate, an array substrate provided opposite to the color filter substrate, and liquid crystal molecules provided between the color filter substrate and the array substrate, a driving thin film transistor for supplying a driving voltage to the liquid crystal molecules is included in the array substrate.

13. The display component of claim 1, wherein the display panel is an OLED display panel, each of the pixel structures comprises an OLED device and a driving thin film transistor for supplying a driving current to the OLED device.

14. The display component of claim 1, wherein the photosensitive layer in the photosensitive element comprises a P-type silicon layer, an intrinsic layer and an N-type silicon layer provided sequentially.

15. The display component of claim 14, wherein the P-type silicon layer, the intrinsic layer and the N-type silicon layer are formed separately by printing.

16. A display device, comprising the display component of claim 1.

17. The display component of claim 1, wherein the display panel comprises a plurality of pixel regions, a pixel structure is provided correspondingly in a pixel region, the control element and the photosensitive element are provided in a gap region between adjacent pixel regions.

* * * * *